Nov. 4, 1969 H. C. DORSETT 3,476,258
BOARD INSERTION AND EXTRACTION SYSTEM
Filed May 18, 1967

INVENTOR.
Henry Carl Dorsett
BY
Ronald P. Shipman
AGENT

United States Patent Office 3,476,258
Patented Nov. 4, 1969

3,476,258
BOARD INSERTION AND EXTRACTION SYSTEM

Henry Carl Dorsett, San Ramon, Calif., assignor to Friden, Inc., a corporation of Delaware Filed May 18, 1967, Ser. No. 639,332
Int. Cl. A47b *95/02;* A47g *19/08*
U.S. Cl. 211—41 5 Claims

ABSTRACT OF THE DISCLOSURE

A plurality of circuit component module boards having connector pins attached thereto at one end are positioned in individual guide rails of a base frame. Each circuit board includes a pair of injector-ejector means pivotally attached to the board for coaction with a pair of shoulders on the frame to substantially ease pushing and pulling of the boards while in the guide rails so that the connector pins can easily engage and disengage with mating connectors disposed on the base frame.

BACKGROUND, FIELD OF INVENTION

This invention pertains to means for inserting and extracting module boards having connector pins into and out of engagement with mating connector means, and more particularly concerns injector-ejector members pivotally mounted and carried on a module board.

BACKGROUND, PRIOR ART

Electrical circuit component carrying boards, such as, for example, well-known printed circuit boards or module boards are usually mounted in close parallel relation with each other in racks forming the frame of an electronic apparatus. The board usually contains a set of connector pins mounted near one end or edge of the boards. Within the racks there are mounted in close relationship with each other a plurality of connector or mating means arranged and adapted to receive the connector pins of the module boards when the boards are fully inserted within the racks. In order that reliable electrical contact be made between each pin and its associated mating means, it is usually the practice to arrange and adapt the pins and mating means so that they mechanically engage or grip each other with substantial force. One of the simplest and most economical ways of providing for such forces is to have the pins and mating means make sliding frictional contact with each other while being connected together, and be deformed in such a manner that the natural resiliency of the pins and/or mating means cause firm continuous gripping therebetween after being inserted. With such an arrangement high frictional forces resisting sliding movement are inherently present while inserting and extracting the boards from the racks.

Most circuit boards are mounted in very close parallel relation to each other, and each contain an optimum number of circuit components such as, for example, resistors, capacitors, diodes, etc., which take up substantially all available surface area of the boards.

In order to properly insert and extract the boards with their connector pins into and from the mating means, it is necessary that means be provided for efficient, reliable insertion and extraction. In the past, extraction means have been provided by simply cutting a finger inserting hole in the board; this takes valuable space that would otherwise be used for mounting circuit components. Further, if the boards are spaced very close together, it is awkward and difficult to insert a finger into the hole of any one board.

Various cam-like devices have, in the past, been incorporated on the boards or mounting racks for insertion and extraction of the boards. Such devices have enjoyed only a moderate degree of success due to complex arrange ment of parts and expense.

SUMMARY

Briefly stated, one embodiment of the present invention is realized by pivotally mounting a pair of generally Y, or yoke-shaped injector-ejector means on the circuit board, and providing rigid shoulder means on a mounting rack. The configuration of each injector-ejector means is such that one arm of the injector-ejector means contacts a shoulder as the board is being inserted. A manually operated arm of the injector-ejector means is pressed firmly, thereby inserting the board easily into mating relation with the mating means. Pulling outwardly on the manually operable arm of the injector-ejector means causes another arm to press against another shoulder thereby extracting the board from mating relation with the mating means.

It is, therefore, an object of the present invention to provide a novel and improved injector-ejector means for inserting and extracting module boards respectively into and out of mating relation with mating means secured within a frame.

The features of novelty that are considered characteristic of this invention are set forth with particularity in the appended claims. The organization and method of operation of the invention may best be understood from the following description when read in connection with the accompanying drawings.

DESCRIPTION OF THE PREFERRED EMBODIMENT

Figure 1:
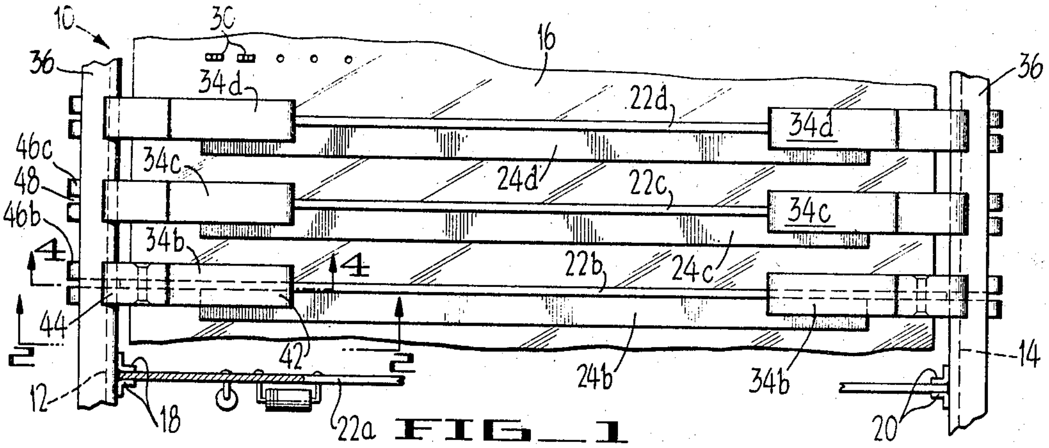
FIG. 1 is a partial plan view showing a plurality of circuit module boards in their normal environment and incorporating the present invention.
Figure 2:
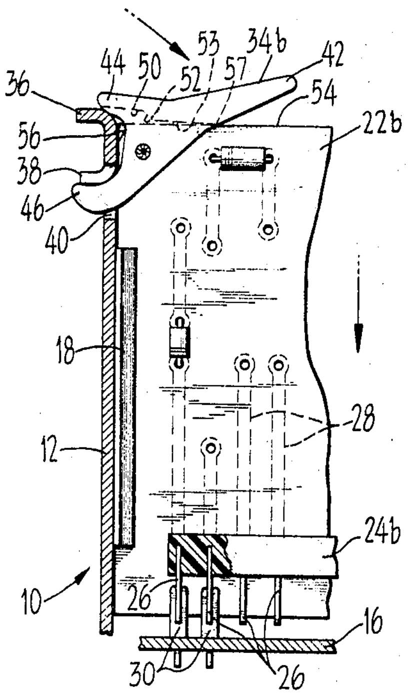
FIG. 2 is a cross-section view along the line 2—2 of FIG. 1 showing one state of operation of the present invention.
Figure 3:
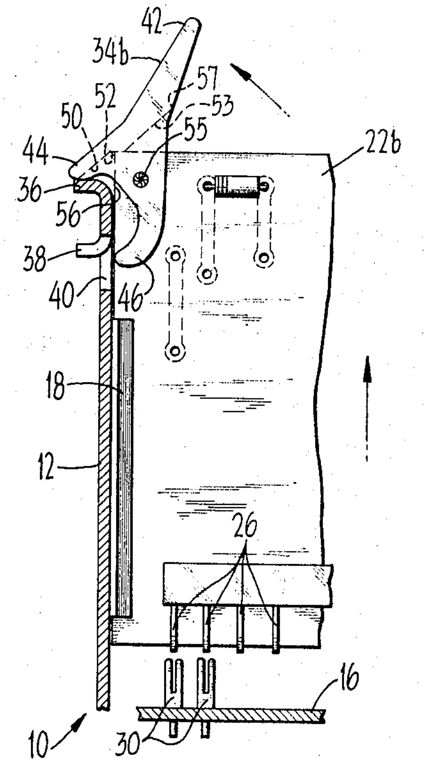
FIG. 3 is a cross-section view along the same line as FIG. 2, showing another state of operation of the present invention.

In FIGS. 1, 2 and 3 a cabinet frame or rack 10 is shown by basic structural members or side plates 12 and 14, extending parallel with each other. A mating connector mounting plate 16 is disposed at or near one end of each side plate 12 and 14, and secured against movement with respect to the side plates by any well-known mechanical means (not shown). A plurality of pairs of card receiving and guiding means or rails 18 (only one pair of which is shown) are securely fastened, as by riveting, welding, bolting, etc., to the inside surface of side plate 12 and extend parallel to each other in a direction upwardly from the mating connector mounting plate 16. In addition, a plurality of pairs of card guiding and receiving rails 20 (only one pair being shown in FIG. 1) are secured to the inside surface of the other side plate 14. Each pair of rails 20 are located directly opposite from an associated rail pair 18 of the side plate 12. In this manner module boards 22 are releasably, slidably inserted into associated pairs of guide rail pairs 18 and 20, and held in close parallel relation to each other, as best shown in FIG. 1.

Each module board 22 is shown as including an associated electrical pin or connector block 24 secured near the end or edge nearest the mating connector plate 16. A plurality of connector means or pins 26 are secured to or in each connector block 24 so as to extend outwardly toward the mating connector mounting plate 16. Individual ones of the pins 26 are electrically connected to particular electrical conducting paths or circuit elements of the module board as indicated generally by the numeral 28 in FIG. 2. It will be recognized by those skilled in the art that connector means or pins 26 may be securely mounted on the module board 22 and electrically connected to the conducting path 28 in any of a variety of ways. The particular manner shown of mounting the pins 26 in or on a block 24 is for ease in showing the principles of the present invention and is not a limiting factor in the present invention.

Directly below, or in line with, each connector pin 26 there is mounted or secured on the mating connector mounting plate 16 an associated or mating connector means or pin 30, as illustrated in FIGS. 2 and 3. The lower end of each mating pin 30 protrudes through the plate 16, and may have one or more electrical conducting wires attached thereto. Here, too, the particular illustrated configuration and mounting of the pins 30 is for the purpose of ease of illustrating the principles of the present invention and is not a limiting factor in the practice of the invention.

Movement of the module boards 22 in a path of travel as dictated by the guide rails 18 and 20 into their fully inserted position, as illustrated in FIG. 2, will effect full electrical and mechanical mating contact between the pins 26 and their associated mating pins 30. Likewise, movement of the module boards away from the plate 16 will cause disconnection between pins 26 and their associated mating pins 30, as shown in FIG. 3. However, as mentioned previously, a substantial amount of force is required to cause the pins 26 and 30 to be mated or disconnected.

In order to very substantially aid the correct insertion and easy removal of the boards, each board is provided with two injector-ejector means or levers 34, individual ones of which coact with a set of lever engaging means or shoulders 36 and 38.

Since each injector-ejector means and associated shoulders are identical with each other, the structure and operation of one is sufficient to also understand the structure and operation of the other.

Figure 4:
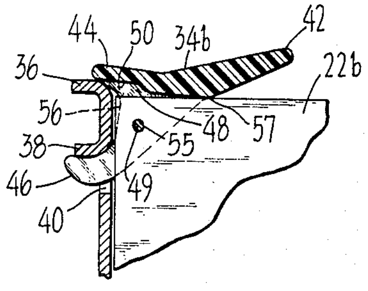
FIG. 4 is a cross-section view along the line 4—4 of FIG. 2 showing further detail of an injector-ejector means of the present invention.

Upper shoulder 36 may be formed by bending the upper edge of side plate 12 outwardly so as to lie in a plane substantially normal to the plane of the side plate, as best shown in FIGS. 2, 3 and 4. Lower shoulder 38 may be formed by the simple process of die punching the side plate so as to cause a leaf of metal to protrude outwardly from the side of the side plate above a hole or opening 40 disposed above an assocaited pair of guide rails 18.

The injector-ejector means 34 is a generally flat, solid, yoke or Y-shaped member, preferably made of a plastics material, having a finger engaging arm or extension 42, an upper shoulder engaging arm or dog 44, and a lower shoulder engaging arm or dog 46. The lower dog 46 is formed with a planar slot 48, best shown in FIG. 4, thereby splitting the lower dog into two halves. The terminal or upper end of the slot 48 terminates in a wall 50 which includes a first portion 52 disposed at an angle to a second portion 53. Each surface 52 and 53 provides a pivoting stop means, as more fully described below. Axially aligned holes or openings for receiving a pivot pin 55 are provided in respective ones of the lower dog halves.

The injector-ejector means 34 is positioned over the upper edge 54 of the module board 22 near one corner 56 such that the rivet containing holes of a lower dog 46 are disposed on opposite sides of the board. A pivot pin or rivet 55, or other securing means, is inserted through the two rivet containing holes and an appropriately located hole 49 in the module board. The rivet permits free pivoting of the injector-ejector means about the axis of the rivet.

The outer extremities or distal ends of the dogs 44 and 46 are spaced from each other by a distance about equal to the spacing between the top surface of upper shoulder 36 and bottom surface of lower shoulder 38, as indicated best in FIGS. 2 and 4. The outer or distal ends of each dog 44 and 46 protrude outwardly past the side of the module board 22 when the injector-ejector means is pivoted to its full injection position as shown in FIGS. 1, 2 and 4. In such full injected position the outer or distal end of the finger-engageable arm 42 is spaced a small distance from the upper edge 54 of the module board so as to readily admit therebetween the tip of a finger for ejection operation as described below. Further, when in such full injection position the outer extremity of the distal end of the lower dog 46 protrudes through hole 40 and is engageable with the lower surface of the lower shoulder 38, and the outer extremity or distal end of the upper dog 44 is just above the upper surface of the upper shoulder 36.

Insertion of a finger tip beneath the distal end of arm 42 and pulling outwardly thereon away from the board will cause the distal end of dog 44 to impinge on upper shoulder 36; the injector-ejector means will act like a lever to pull the module board 22 upwardly and, accordingly, pull the pins 26 out of mating engagement with their mating connectors 30. In so doing, the injector-ejector means will pivot about the rivet 55 and the lower dog 46 will swing downwardly away from the lower shoulder 38 and inwardly through the hole 40 toward the module board 22.

When the distal end of the lower dog 46 is completely inward of the side edge of the module board, the sloped or angled portion 52 of the slot surface 50 at the terminus of slot 48 strikes the upper edge of corner 56 of the board as shown in FIG. 3; further outward pivoting of the injector-ejector means is inhibited. In this extreme outer position the arm 42 is still inclined at an angle to the upper edge 54 of the circuit board. It has been found that such angled arm has the effect of acting like a hook for further aid in gripping and pulling of the module board fully from the guide rails by the fingers of the operator.

To insert the board, it is manually guided into opposite pairs of guide rails 18 and 20 while generally holding each of the two injector-ejector means in a position so as to have the lower dogs 46 inside the associated board edge. As the board is pushed further into the guide rails, the upper dogs 44 impinge on the upper shoulders 36. At about this same position the pins 26 are just beginning to make contact with the mating connector pins 30. Now, pressure applied to the arms 42 in a direction toward the upper edge 54 of the board will cause the injector-ejector means to pivot about the rivet 55 so as to move the lower dog 46 through the hole 40 and into engagement with the lower surface of shoulder 38. Further pressure on the arm 42 will cause the injector-ejector means to act like a lever and further push the board inwardly so as to mate pins 26 firmly with mating connector pins 30. The outer edge 57 of the slot's terminus surface portion 53 then strikes the upper edge 54 of the module board; further pivoting of injector-ejector means is thus prevented. However, it is to be noted that the force imposed by the operator's finger on the arm 42 will then cause the upper dog 44 to be urged into firm engagement with the upper shoulder. Since the upper shoulder is stationary with respect to the connector mounting plate 16, further movement downwardly of the module board 22 is prohibited. Thus, the board is placed in a precise mating relation with respect to the plate 16. It can thus be readily understood that too much force on the module board and connector pins 26 and 30 is avoided and damage to the pins is thus obviated.

There has thus been shown and described a module board inserting and extraction system that is simple to use, economical to manufacture and reliable in operation.

While the principles of the invention have been made clear in the illustrative embodiment, there will be obvious to those skilled in the art many modifications in structure, arrangement, proportions, the elements, materials, and components, used in the practice of the invention, and otherwise, which are adapted for specific environments and operating requirements, without departing from these principles.

What is claimed is:

1. In combination:
- a module board;
- frame means including means for releasably, slidably, receiving a portion of said board;
- a pair of shoulders mounted on said frame means in substantially fixed rigid relation with said frame means;
- manually operable means pivotally mounted on said board for moving said board in said frame, said manually operable means having a finger engageable arm and a pair of integral spaced apart dogs extending from said arm, each of said dogs having a shoulder engaging surface, said surfaces facing each other, said surface of one of said dogs arranged and adapted to contact one of said shoulders to apply a force to one of said shoulders in response to a manually applied force in one direction to said manually operable means for forcibly slidably inserting said board into said frame means, and said surface of the other one of said dogs arranged and adapted to contact the other one of said shoulders to apply a force to the other one of said shoulders in response to a manually applied force in a direction opposite to said one direction to said manually operable means for forcibly slidably extracting said board from said frame means.

2. In the combination according to claim 1 wherein said manually operable means further includes a surface engageable with said module board to preclude pivoting beyond a predetermined position.

3. In combination:
- a module board;
- frame means including,
  - means for releasably, slidably receiving a portion of said board, and

- a relatively rigid side member having board guiding means secured to one side thereof,
  - said side member having a first angled integral portion forming a first shoulder, and a second angled integral portion forming a second shoulder;
- a portion of said module board being removably slidably received in said guiding means;
- and manually operable means pivotally mounted on said board for moving said board in said frame, said manually operable means having a finger engageable arm and a pair of dogs extending from said arm, one of said dogs engaging one of said shoulders when said board is slidably inserted into said frame means, the other one of said dogs engaging the other one of said shoulders when said board is slidably extracted from said frame means.

4. In the combination according to claim 3 wherein a portion of said manually operable means straddles said module board.

5. In the combination according to claim 1 wherein said module board has an edge portion in close proximity to said side member when received in said guiding means;
- said manually operable means being pivotable between a first position wherein one of said dogs is located inwardly of said edge portion while the other one of said dogs extends outwardly of said edge portion, and a second position wherein both of said dogs extend outwardly of said edge portion.

References Cited

UNITED STATES PATENTS

| | | | |
|---|---|---|---|
| 2,993,187 | 7/1961 | Bisbing | 339—17 |
| 2,217,496 | 10/1940 | Riley | 339—45 X |
| 3,017,232 | 1/1962 | Schwab | 211—41 X |
| 3,311,863 | 3/1967 | Beale | 339—45 |

CHANCELLOR E. HARRIS, Primary Examiner

U.S. Cl. X.R.

312—320; 339—17, 45

UNITED STATES PATENT OFFICE
CERTIFICATE OF CORRECTION

Patent No. 3,476,258 November 4, 1969

Henry Carl Dorsett

It is certified that error appears in the above identified patent and that said Letters Patent are hereby corrected as shown below:

Column 1, line 66, "in" should read -- into --. Column 3, line 52, "assocaited" should read -- associated --. Column 6, line 21, claim reference numeral "1" should read -- 3 --.

Signed and sealed this 21st day of April 1970.

(SEAL)
Attest:

Edward M. Fletcher, Jr.
Attesting Officer

WILLIAM E. SCHUYLER, JR.
Commissioner of Patents